United States Patent

Tenny

(10) Patent No.: US 9,037,163 B2
(45) Date of Patent: May 19, 2015

(54) METHOD AND APPARATUS FOR CONTINUITY OF POSITIONING DETERMINATION AT HANDOVER

(75) Inventor: Nathan Edward Tenny, Poway, CA (US)

(73) Assignee: QUALCOMM Incorporated, San Diego, CA (US)

(*) Notice: Subject to any disclaimer, the term of this patent is extended or adjusted under 35 U.S.C. 154(b) by 608 days.

(21) Appl. No.: 12/897,924

(22) Filed: Oct. 5, 2010

(65) Prior Publication Data

US 2011/0250887 A1    Oct. 13, 2011

Related U.S. Application Data

(60) Provisional application No. 61/250,230, filed on Oct. 9, 2009.

(51) Int. Cl.
*H04W 24/00* (2009.01)
*H04W 36/00* (2009.01)
*H04W 56/00* (2009.01)

(52) U.S. Cl.
CPC .................................. *H04W 56/00* (2013.01)

(58) Field of Classification Search
CPC ...................................................... H04W 56/00
USPC ........ 455/436, 437, 561, 550.1, 456.1, 456.6; 370/331
See application file for complete search history.

(56) References Cited

U.S. PATENT DOCUMENTS

| | | | |
|---|---|---|---|
| 5,711,003 A | 1/1998 | Dupuy | |
| 7,986,709 B2 | 7/2011 | Lundby et al. | |
| 2004/0246923 A1* | 12/2004 | Achard | 370/331 |
| 2008/0084849 A1 | 4/2008 | Wang et al. | |
| 2008/0305801 A1* | 12/2008 | Burgess et al. | 455/444 |
| 2010/0234028 A1* | 9/2010 | Narasimha et al. | 455/437 |

FOREIGN PATENT DOCUMENTS

| | | |
|---|---|---|
| CN | 1589584 A | 3/2005 |
| JP | H09504144 A | 4/1997 |
| JP | 2002503913 A | 2/2002 |
| TW | 200746757 A | 12/2007 |
| WO | WO-9427383 A1 | 11/1994 |

(Continued)

OTHER PUBLICATIONS

International Search Report and Written Opinion—PCT/US2010/052186, International Search Authority—European Patent Office—Dec. 20, 2010.

(Continued)

*Primary Examiner* — Opiribo Georgewill

(57) ABSTRACT

Methods and devices are provided for observed time difference of arrival (OTDOA) continuity at handover. In one embodiment, the method may involve, in response to being served by a first serving cell, receiving a first set of timing offsets provided in assistance data from the network. The method may involve, in response to being handed over to a second serving cell, deriving a second set of timing offsets from the first set of timing offsets. The method may involve adjusting measured time difference of arrival (TDOA) values of detected first signals according to the first set of timing offsets, and/or adjusting measured TDOA values of detected second signals according to the second set of timing offsets.

36 Claims, 11 Drawing Sheets

(56) References Cited

FOREIGN PATENT DOCUMENTS

| | | |
|---|---|---|
| WO | WO-9941854 A1 | 8/1999 |
| WO | WO-2008024880 | 2/2008 |

OTHER PUBLICATIONS

Qualcomm Europe: "Continuity at handover for OTDOA", 3GPP Draft; R2-096966, 3rd Generation Partnership Project (3GPP), Mobile Competence Centre ; 650, Route Des Lucioles ; F-06921 Sophia-Antipolis Cedex ; France, no. Jeju; 20091109, Nov. 9, 2009, XP050391343, [retrieved on Nov. 3, 2009].

Zte: "Discussion on UE Positioning in handover", 3GPP Draft; R2-094728, 3rd Generation Partnership Project (3GPP), Mobile Competence Centre ; 650, Route Des Lucioles ; F-06921 Sophia-Antipolis Cedex ; France, no. Shenzhen, China; 20090818, Aug. 18, 2009, XP050352781, [retrieved on Aug. 18, 2009].

Taiwan Search Report—TW099134622—TIPO—May 30, 2013.

\* cited by examiner

METHOD AND APPARATUS FOR CONTINUITY OF POSITIONING DETERMINATION AT HANDOVER

CLAIM OF PRIORITY UNDER 35 U.S.C. §119

The present Application for Patent claims priority to Provisional Application No. 61/250,230, entitled "MANAGEMENT OF ASSISTANCE DATA FOR CONTINUITY OF OBSERVED TIME DIFFERENCE OF ARRIVAL (OTDOA) POSITIONING AT CHANGE OF REFERENCE TIMELINE," filed Oct. 9, 2009, and is assigned to the assignee hereof, and is hereby expressly incorporated in its entirety by reference herein.

BACKGROUND

1. Field

The present application relates generally to wireless communications, and more specifically to systems and methods for achieving observed time difference of arrival (OTDOA) continuity at handover.

2. Background

The 3rd Generation Partnership Project (3GPP) Long Term Evolution (LTE) represents a major advance in cellular technology and is the next step forward in cellular 3G services as a natural evolution of Global System for Mobile communications (GSM) and Universal Mobile Telecommunications System (UMTS). LTE provides for an uplink speed of up to 50 megabits per second (Mbps) and a downlink speed of up to 100 Mbps and brings many technical benefits to cellular networks. LTE is designed to meet carrier needs for high-speed data and media transport as well as high-capacity voice support. Bandwidth is scalable from 1.25 MHz to 20 MHz. This suits the needs of different network operators that have different bandwidth allocations, and also allows operators to provide different services based on spectrum. LTE is also expected to improve spectral efficiency in 3G networks, allowing carriers to provide more data and voice services over a given bandwidth. LTE encompasses high-speed data, multimedia unicast and multimedia broadcast services.

The LTE physical layer (PHY) is a highly efficient means of conveying both data and control information between an evolved NodeB (eNB) and mobile entities (MEs), such as, for example, access terminals (ATs) or user equipment (UE). The LTE PHY employs some advanced technologies that are new to cellular applications. These include Orthogonal Frequency Division Multiplexing (OFDM) and Multiple Input Multiple Output (MIMO) data transmission. In addition, the LTE PHY uses Orthogonal Frequency Division Multiple Access (OFDMA) on the downlink (DL) and Single-Carrier Frequency Division Multiple Access (SC-FDMA) on the uplink (UL). OFDMA allows data to be directed to or from multiple users on a subcarrier-by-subcarrier basis for a specified number of symbol periods.

In systems that lack a global time reference (e.g., 3GPP systems), the reference timeline for observed time difference of arrival (OTDOA) may be based on the timing of a particular network element, such as, for example, a first cell serving a ME to be positioned. Handover of the ME to a second cell after reception of assistance data may render the assistance data invalid due to the different timelines associated with the two cells. Accordingly, it would be desirable to adjust the calculation of time difference of arrival (TDOA) values according to information regarding the second cell, thereby achieving OTDOA continuity at handover.

SUMMARY

In accordance with one or more embodiments and corresponding disclosure thereof, various aspects are described in connection with a method for observed time difference of arrival (OTDOA) continuity at handover. The method may be performed by a mobile entity (ME) in a wireless network, and may involve, in response to the ME being served by a first serving cell, receiving a first set of timing offsets provided in assistance data from the network. The first set of timing offsets may be relative to a first reference cell. The method may involve, in response to the ME being handed over to a second serving cell, deriving a second set of timing offsets from the first set of timing offsets. The second set of timing offsets may be relative to a second reference cell. The method may optionally involve adjusting measured time difference of arrival (TDOA) values of detected first signals according to the first set of timing offsets, and/or adjusting measured TDOA values of detected second signals according to the second set of timing offsets.

In related aspects, deriving the second set of timing offsets may involve adding to each offset a timing difference between the first and second reference cells. For example, the timing difference may be based at least in part on the assistance data from the network. In another example, the timing difference may be based at least in part on measurements made by the ME as part of a handover procedure. In yet another example, the timing difference may be received from the network in association with a handover procedure.

In further related aspects, the first reference cell may comprise the second reference cell. Adjusting the measured TDOA values of the detected second signals may involve calculating a given timing offset between the second serving cell and the first reference cell, as well as adding the given timing offset to the measured TDOA values of the detected second signals. In yet further related aspects, an electronic device may be configured to execute the above described methodology.

In accordance with one or more embodiments and corresponding disclosure thereof, various aspects are described in connection with an apparatus for OTDOA continuity at handover. The apparatus may include an electrical component for receiving a first set of timing offsets provided in assistance data from a wireless network, in response to a ME being served by a first serving cell, the first set of timing offsets being relative to a first reference cell. The apparatus may also include an electrical component for deriving a second set of timing offsets from the first set of timing offsets, in response to the ME being handed over to a second serving cell, the second set of timing offsets being relative to a second reference cell. The apparatus may optionally include an electrical component for adjusting measured time difference of arrival (TDOA) values of detected first signals according to the first set of timing offsets, and/or an electrical component for adjusting measured TDOA values of detected second signals according to the second set of timing offsets.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects may be employed. Other novel features will become apparent from the following detailed description when considered in conjunction with the drawings and the disclosed aspects are intended to include all such aspects and their equivalents.

DESCRIPTION

Figure 1:
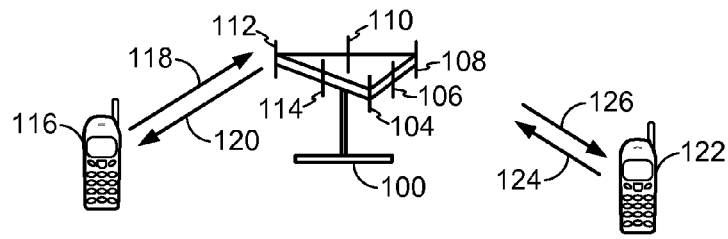
FIG. 1 illustrates a multiple access wireless communication system.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific details. In other instances, well-known structures and devices are shown in block diagram form in order to facilitate describing one or more embodiments.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single-Carrier Frequency Division Multiple Access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. SC-FDMA is used for uplink multiple access in 3GPP LTE, or Evolved UTRA.

Referring to FIG. 1, a multiple access wireless communication system according to one embodiment is illustrated. An access point 100 (e.g., base station, evolved NodeB (eNB), or the like) includes multiple antenna groups, one including 104 and 106, another including 108 and 110, and an additional including 112 and 114. In FIG. 1, two antennas are shown for each antenna group, however, more or fewer antennas may be utilized for each antenna group. A mobile entity (ME) 116 is in communication with the antennas 112 and 114, where the antennas 112 and 114 transmit information to the ME 116 over a forward link 120 and receive information from the ME 116 over a reverse link 118. An ME 122 is in communication with the antennas 106 and 108, where the antennas 106 and 108 transmit information to the ME 122 over a forward link 126 and receive information from the ME 122 over a reverse link 124. In a Frequency Division Duplex (FDD) system, the communication links 118, 120, 124 and 126 may use different frequency for communication. For example, the forward link 120 may use a different frequency than that used by the reverse link 118.

Each group of antennas and/or the area in which they are designed to communicate is often referred to as a sector of the access point. In the embodiment, antenna groups each are designed to communicate to MEs in a sector, of the areas covered by the access point 100.

In communication over the forward links 120 and 126, the transmitting antennas of the access point 100 utilize beamforming in order to improve the signal-to-noise ratio of forward links for the different MEs 116 and 124. Also, an access point using beamforming to transmit to MEs scattered randomly through its coverage causes less interference to MEs in neighboring cells than an access point transmitting through a single antenna to all its MEs.

An access point may be a fixed station used for communicating with the terminals and may also be referred to as an access point, a NodeB, an eNB, or some other terminology. A ME may also be referred to as an access terminal (AT), a user equipment (UE), a wireless communication device, terminal, or the like.

Figure 2:
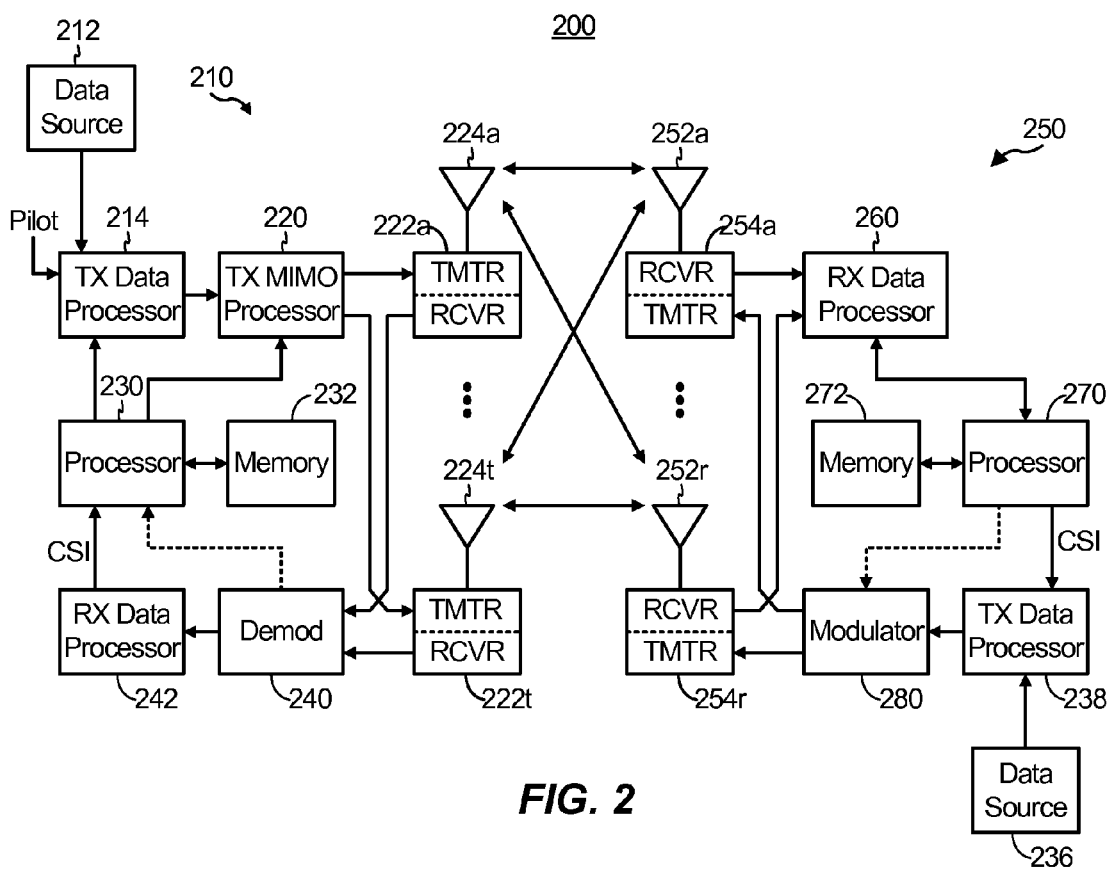
FIG. 2 illustrates a block diagram of a communication system.

FIG. 2 is a block diagram of an embodiment of a transmitter system 210 (also known as an access point) and a receiver system 250 (also known as a ME) in a MIMO system 200. At the transmitter system 210, traffic data for a number of data streams is provided from a data source 212 to a transmit (TX) data processor 214.

In an embodiment, each data stream is transmitted over a respective transmit antenna. The TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped)

based on a particular modulation scheme (e.g., Binary Phase Shift Keying (BPSK), Quadrature Phase Shift Keying (QSPK), M-ary Phase-Shift Keying (M-PSK), or Multi-Level Quadrature Amplitude Modulation (M-QAM)) selected for that data stream to provide modulation symbols. The data rate, coding, and modulation for each data stream may be determined by instructions performed by a processor 230, which may be in operative communication with a memory 232.

The modulation symbols for the data streams are then provided to a TX MIMO processor 220, which may further process the modulation symbols (e.g., for OFDM). The TX MIMO processor 220 then provides $N_T$ modulation symbol streams to $N_T$ transmitters (TMTR) 222a through 222t. In certain embodiments, the TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from the transmitters 222a through 222t are then transmitted from $N_T$ antennas 224a through 224t, respectively.

At the receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

A RX data processor 260 then receives and processes the $N_R$ received symbol streams from the $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by the RX data processor 260 is complementary to that performed by the TX MIMO processor 220 and the TX data processor 214 at the transmitter system 210.

A processor 270 periodically determines which pre-coding matrix to use, discussed further below. The processor 270 formulates a reverse link message comprising a matrix index portion and a rank value portion, and may be in operative communication with a memory 272.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by the transmitters 254a through 254r, and transmitted back to the transmitter system 210.

At the transmitter system 210, the modulated signals from the receiver system 250 are received by the antennas 224, conditioned by the receivers 222, demodulated by a demodulator 240, and processed by a RX data processor 242 to extract the reserve link message transmitted by the receiver system 250. The processor 230 then determines which pre-coding matrix to use for determining the beamforming weights then processes the extracted message.

Figure 3:
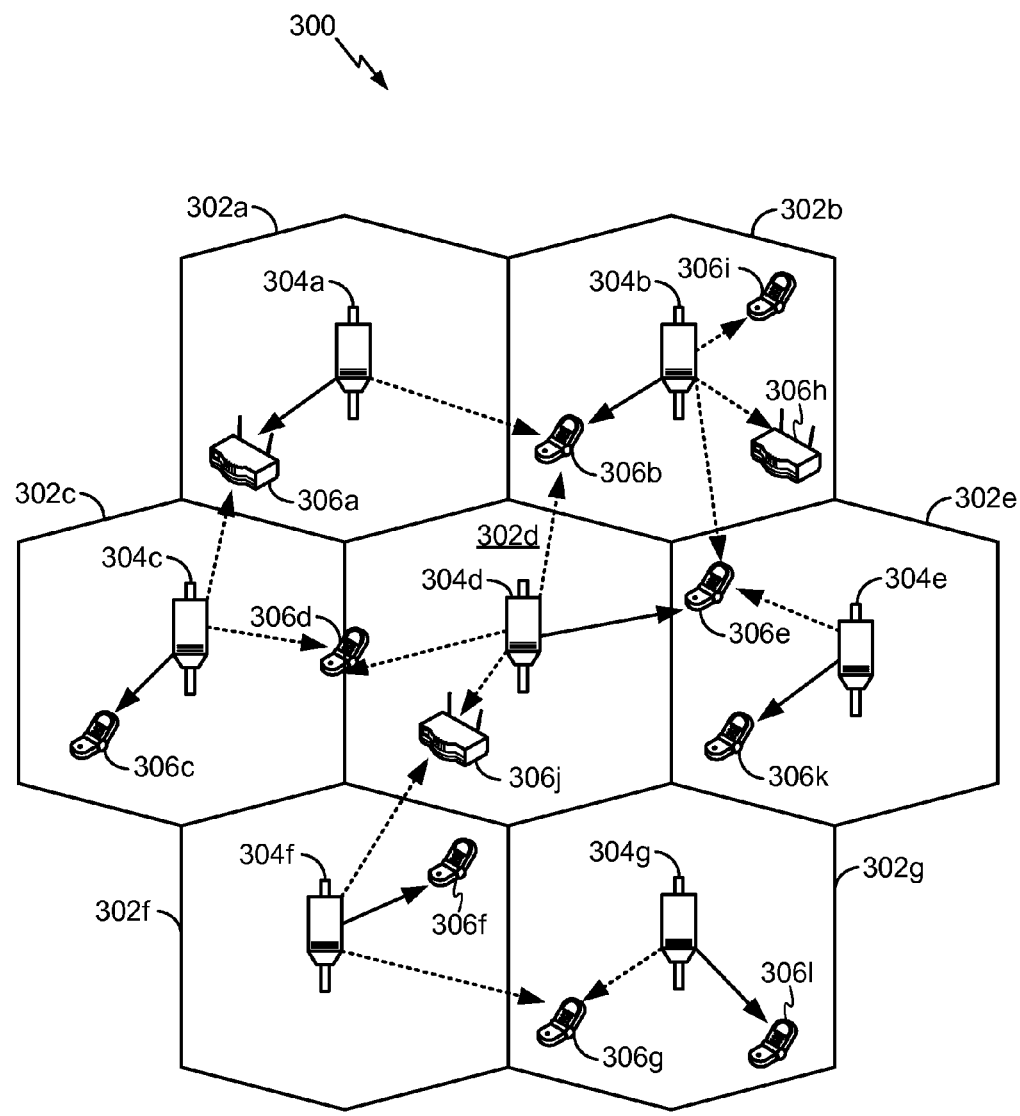
FIG. 3 illustrates a wireless communication system configured to support a number of users.

FIG. 3 illustrates a wireless communication system 300, configured to support a number of users, in which the teachings herein may be implemented. The system 300 provides communication for multiple cells 302, such as, for example, macro cells 302a-302g, with each cell being serviced by a corresponding access node 304 (e.g., access nodes 304a-304g). As shown in FIG. 2, MEs 306 (e.g., MEs 306a-306l) may be dispersed at various locations throughout the system over time. Each ME 306 may communicate with one or more access nodes 304 on a forward link ("FL") and/or a reverse link ("RL") at a given moment, depending upon whether the ME 306 is active and whether it is in soft handoff, for example. The wireless communication system 300 may provide service over a large geographic region. For example, macro cells 302a-302g may cover a few blocks in a neighborhood.

Figure 4:
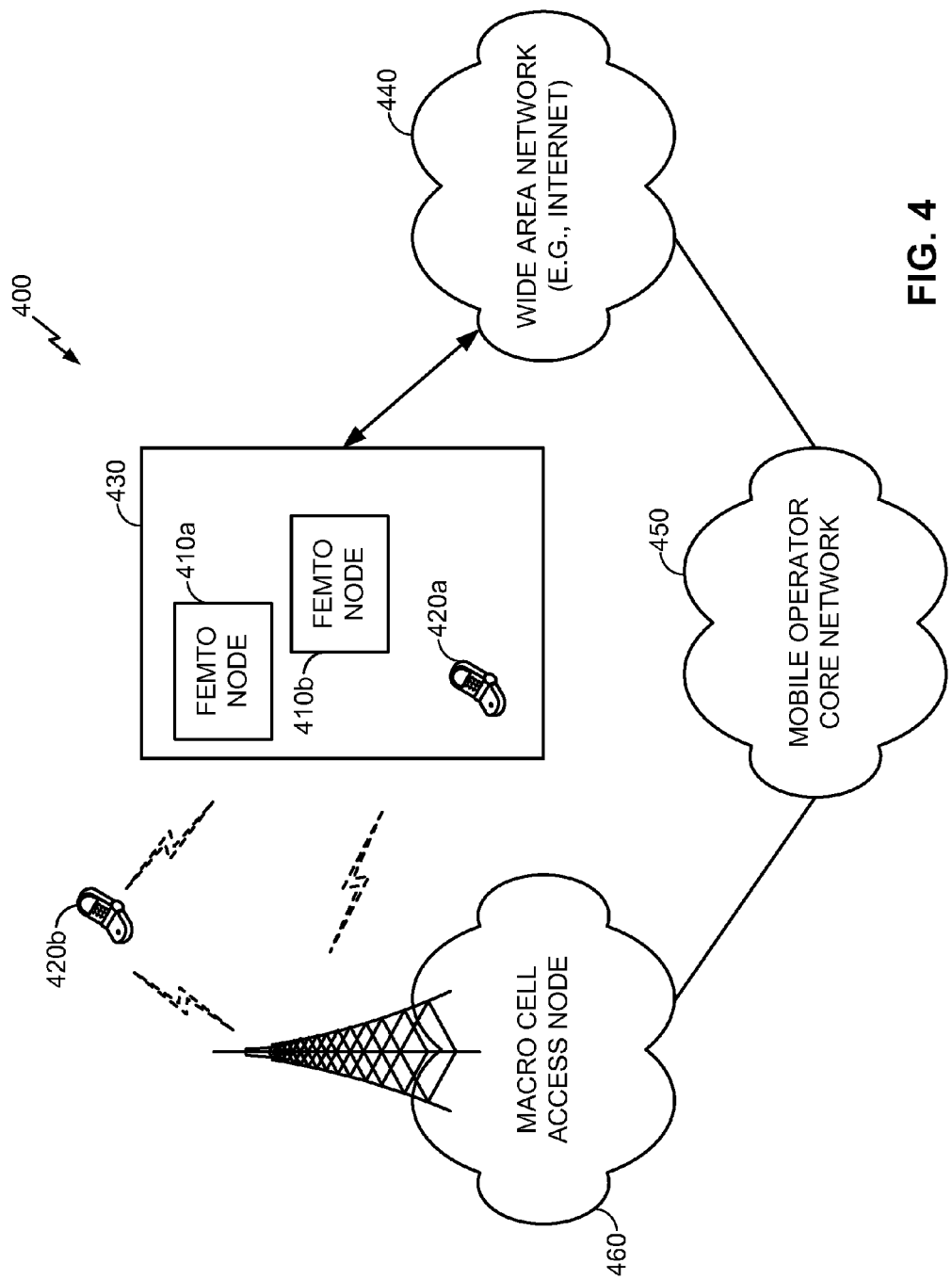
FIG. 4 illustrates an exemplary communication system to enable deployment of femto nodes within a network environment.

FIG. 4 illustrates an exemplary communication system 400 where one or more femto nodes are deployed within a network environment. Specifically, the system 400 includes multiple femto nodes 410 (e.g., femto nodes 410a and 410b) installed in a relatively small scale network environment (e.g., in one or more user residences 430). Each femto node 410 may be coupled to a wide area network 440 (e.g., the Internet) and a mobile operator core network 450 via a DSL router, a cable modem, a wireless link, or other connectivity means (not shown). Each femto node 410 may be configured to serve an associated ME 420a and, optionally, an alien ME 420b. In other words, access to femto node(s) 410 may be restricted whereby a given ME 420 may be served by a set of designated (e.g., home) femto nodes but may not be served by any non-designated femto nodes (e.g., a neighbor's femto node).

Figure 5:
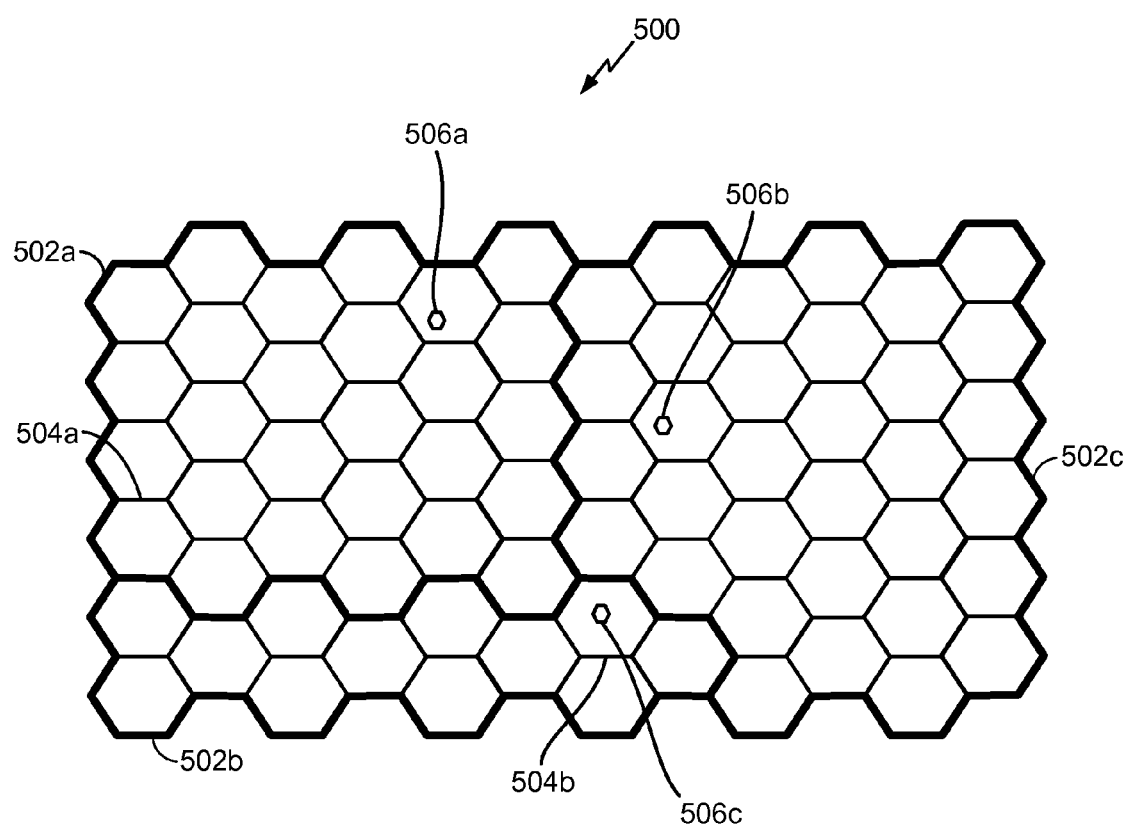
FIG. 5 illustrates an example of a coverage map with several tracking areas defined.

FIG. 5 illustrates an example of a coverage map 500 where several tracking areas 502 (or routing areas or location areas) are defined, each of which includes several macro coverage areas 504. Here, areas of coverage associated with tracking areas 502a, 502b, and 502c are delineated by the wide lines and the macro coverage areas 504 are represented by the hexagons. The tracking areas 502 also include femto coverage areas 506. In this example, each of the femto coverage areas 506 (e.g., femto coverage area 506c) is depicted within the macro coverage area 504 (e.g., macro coverage area 504b). It should be appreciated, however, that a femto coverage area 506 may not lie entirely within a macro coverage area 504. In practice, a large number of femto coverage areas 506 may be defined with a given tracking area 502 or macro coverage area 504. Also, one or more pico coverage areas (not shown) may be defined within a given tracking area 502 or macro coverage area 504.

Embodiments described herein present techniques for adjusting stored assistance data for use in observed time difference of arrival (OTDOA) positioning, thereby allowing a positioning operation to take place even though a reference timeline used for measurement changes. OTDOA generally involves measuring time differences, wherein the measured time differences may be provided in assistance data as offsets relative to a given reference timeline. For example, in advanced forward link trilateration (AFLT), a similar positioning method in CDMA2000 systems, the reference timeline is the CDMA system time, which is constant from cell to cell. However, in other systems, particularly in so-called "asynchronous" deployments in which the timing of different base stations may be different, the reference timeline may be based on the timing of a particular network element such as the cell currently serving the ME to be positioned. In such a scenario, a handover of the ME from a first cell to a second cell after reception of assistance data may render the assistance data invalid, since the timing information relates to the timeline of the first cell. The ME may be aligned to a potentially different timeline in the second cell.

Figure 6:
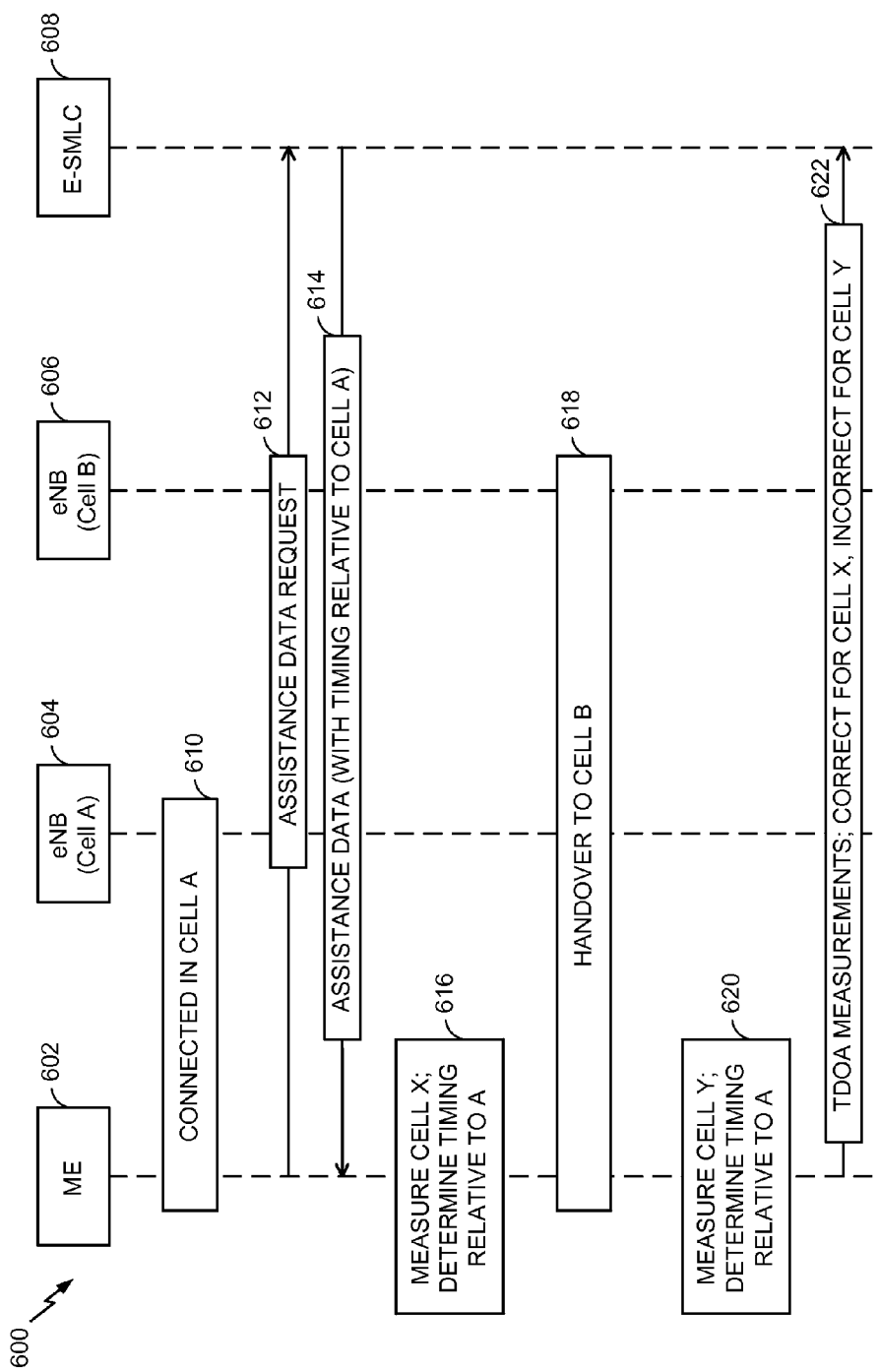
FIG. 6 is a call flow diagram for a wireless network having misalignment of a timeline.

With reference to FIG. 6, there is provided a call flow diagram showing how such a misalignment of the timeline can result in inaccurate positioning. For example, a wireless network 600 may include a ME 602 in operative communication with a network infrastructure entity 604 (e.g., an eNB) for a cell A, or an infrastructure entity 606 (e.g., an eNB) for a cell B. One or both infrastructure entities 604, 606 may be in operative communication with a server 608, such as, for example, an Evolved Serving Mobile Location Center (E-SMLC) server or the like.

Cell A and cell B are assumed to be operated by different eNBs; otherwise, it is quite probable that their transmit timing would be the same and the problem would not occur. The reference signals of cell X and cell Y (not shown in the diagram) may be measured to determine the TDOA relative to the serving cell.

For example, at 610, the ME 602 may be connected in cell A. At 612, the ME may send an assistance data request to an infrastructure entity (e.g., 604 or 606), which in turn may send the assistance data request to the server 608. At 614, the server 608 may send the assistance data (with timing relative to cell A) to the ME 602.

The assistance data received by the ME may include timing information for each cell that the ME might measure. In LTE, for example, this timing information may be given as an offset relative to the serving cell. That is, if cells A, B, C, etc., have absolute timing offsets $T_A$, $T_B$, $T_C$, etc., respectively, compared to a common timeline, then the assistance data delivered when the ME is served by cell A may be used to calculate the timing offsets of the cells relative to the serving cell. For example, the relative offset may be $T_B-T_A$ for cell B, $T_C-T_A$ for cell C, and so on.

At 616, the ME may measure the TDOA of detected signals of cell X relative to cell A. In order to determine the TDOA between cell X and cell A (the serving cell), the ME may adjust the observed time of arrival of a signal from cell X by the appropriate relative offset, in this case $(T_X-T_A)$, to compensate for the transmit time difference. The result is an accurate measurement of the TDOA between cell X and cell A.

However, after the handover to cell B, at 618, if the timing offsets in the assistance data are not updated, the ME no longer has accurate information to apply to the observed times of arrival. If the ME takes no action to compensate for the handover, then when it measures the TDOA between cell Y and the serving cell (now cell B), at 620, it may adjust the observed time of arrival by $(T_Y-T_A)$, as if it were still comparing to cell A, rather than the correct value $(T_Y-T_B)$. At 622, the result is an incorrect reported value for the TDOA between cell Y and cell B, since the ME is assuming an inaccurate transmission time for cell Y.

In the specific case of an LTE system, observed time difference of arrival (OTDOA) positioning may be designed to work in both synchronous and asynchronous deployments. Accordingly, the problem described above may arise in LTE deployments, particularly in asynchronous systems but potentially also in nominally synchronous deployments whose synchronization is not fine enough to support accurate OTDOA positioning.

The problem described above has its root in the idea of having a ME associate the received assistance data with a consistent timeline (that of the serving cell, which is also being used as the reference cell), and base its assumptions about the transmit timing of measured cells on that single timeline. One approach to addressing this problem involves making the ME's "reference" timeline dynamic: at the time of handover, the ME may shift its internal "reference" timeline by an appropriate value, e.g., $-(T_B-T_A)$. The result is that, when cell Y is being measured, the ME applies an offset for the transmission timing of $(T_Y-T_A)-(T_B-T_A)=(T_Y-T_B)$, which is in fact the correct offset. Effectively, this process consists of changing the reference cell from cell A to cell B.

Figure 7:
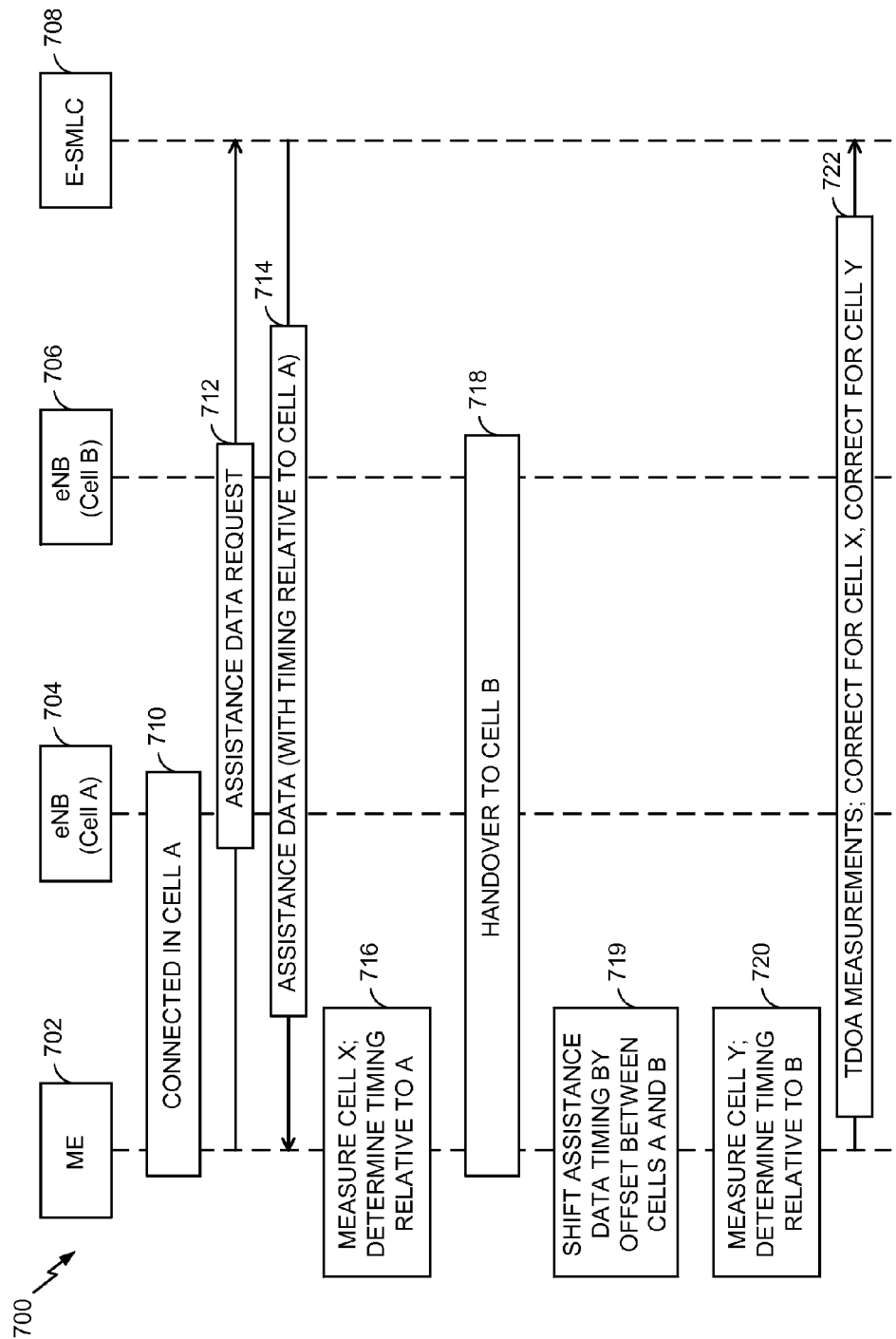
FIG. 7 is a call flow diagram for a wireless network applying a timing offset to achieve correct timeline alignment.

With reference to FIG. 7, there is illustrated a wireless network 700 that may include a ME 702 in operative communication with a network infrastructure entity 704 for a cell A, or an infrastructure entity 706 for a cell B. One or both infrastructure entities 704, 706 may be in operative communication with a server 708 (e.g., an E-SMLC server). In contrast to the ME 602 of the network 600 shown in FIG. 6, however, the ME 702 of the network 700, at 719, shifts its assistance data timing by an offset between cell A and cell B, namely, $-(T_B-T_A)$. This effectively changes the reference cell to cell B, such that, at 720, the ME 702 correctly measures the timing of cell Y relative to cell B. For the sake of conciseness, the rest of the details regarding the network 700 are not further elaborated on; however, it is to be understood that the remaining features and aspects are substantially similar to those described above with respect to the network 600 of FIG. 6.

With equivalent effect, the ME may be implemented in such a way that it does not attempt to determine the transmission timing of each cell relative to the serving cell at all. Rather, when the ME measures a pair of cells (e.g., a cell V and a cell W), it can adjust the measured TDOA by the difference in their transmit times as described in the assistance data, without reference to the timeline maintained by the ME in the serving cell, and without any special treatment of the serving cell itself. In this model, cell A is being maintained as the reference cell, and all time differences are being determined with reference to the timeline of cell A even though the operation of the ME is no longer locked to that timeline in the lower layers.

In view of exemplary systems shown and described herein, methodologies that may be implemented in accordance with the disclosed subject matter, will be better appreciated with reference to various flow charts. While, for purposes of simplicity of explanation, methodologies are shown and described as a series of acts/blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement the methodologies described herein. It is to be appreciated that functionality associated with blocks may be implemented by software, hardware, a combination thereof or any other suitable means (e.g., device, system, process, or component). Additionally, it should be further appreciated that methodologies disclosed throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 8:
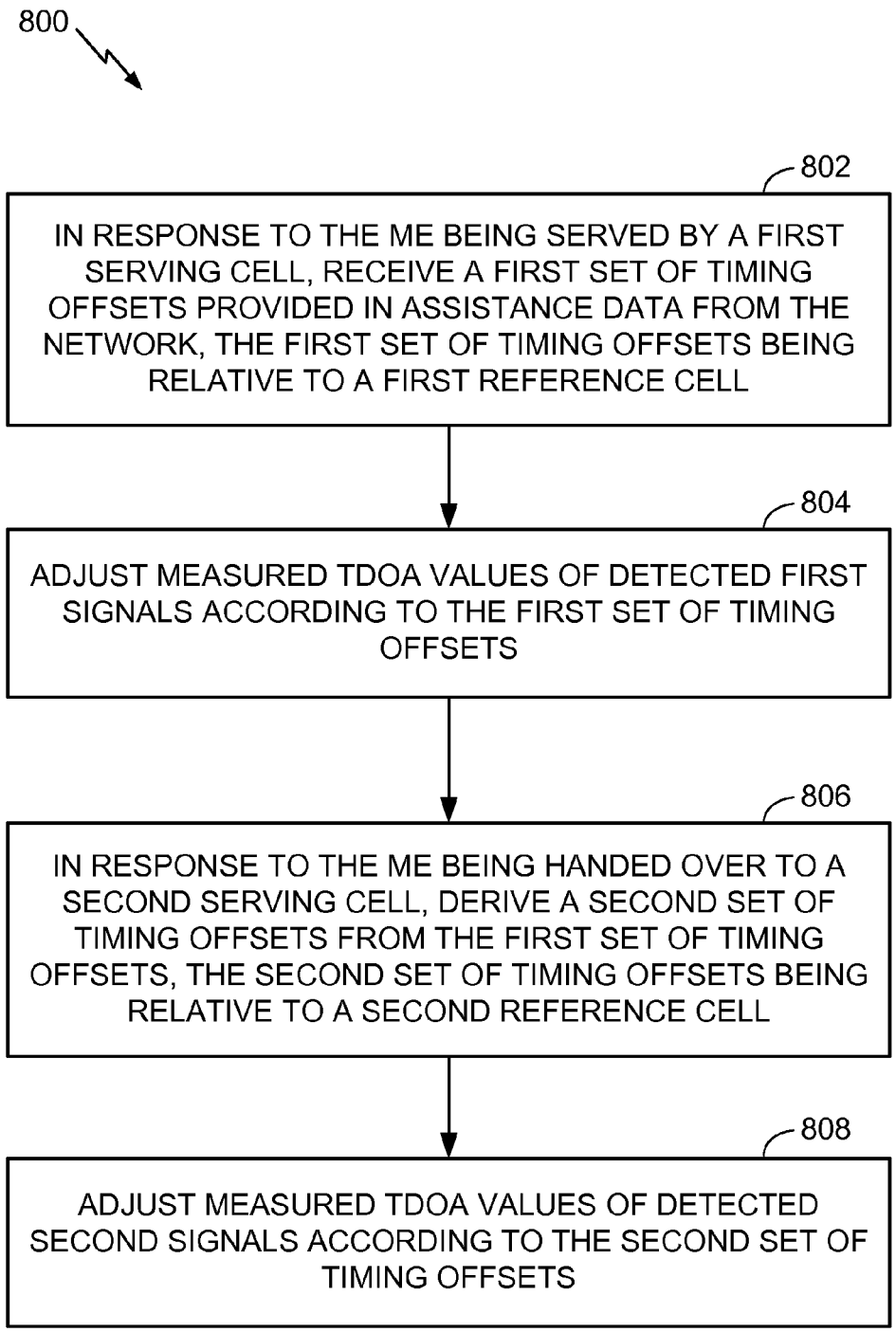
FIG. 8 illustrates an example methodology for observed time difference of arrival (OTDOA) continuity at handover.

In accordance with one or more aspects of the subject of this disclosure, there is provided a method for OTDOA continuity at handover. With reference to FIG. 8, illustrated is a methodology 800 that may be performed at a wireless communication apparatus, such as an ME. At 802, in response to a ME being served by a first serving cell, a first set of timing offsets provided in assistance data may be received from a wireless network. The first set of timing offsets may be relative to a first reference cell. At 804, measured TDOA values of detected first signals may be optionally adjusted according to the first set of timing offsets. At 806, in response to the ME being handed over to a second serving cell, a second set of timing offsets may be derived from the first set of timing offsets. The second set of timing offsets may be relative to a second reference cell. At 808, measured TDOA values of detected second signals may be optionally adjusted according to the second set of timing offsets.

Figure 9:
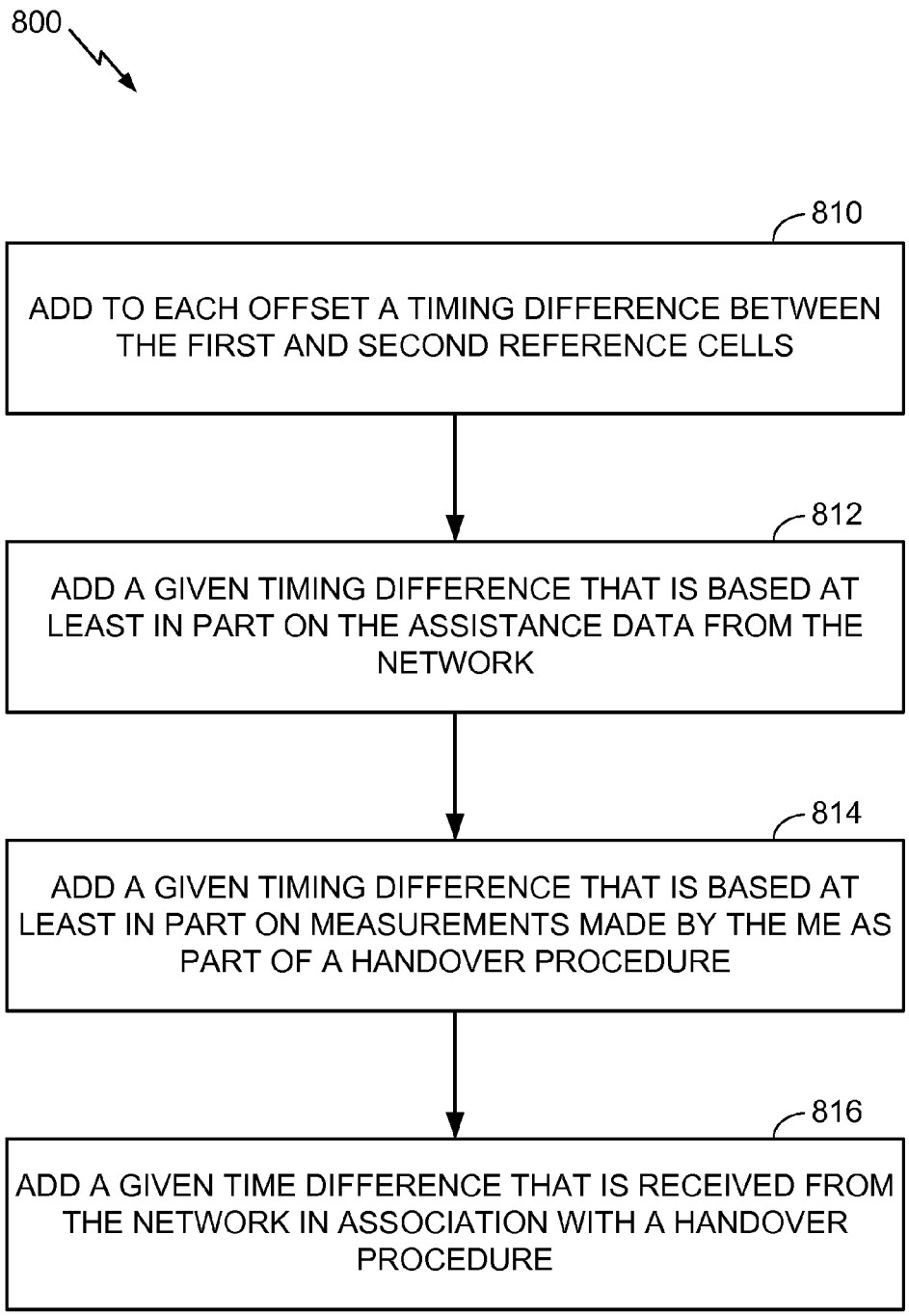
FIGS. 9-10 show further aspects of the methodology of FIG. 8.

With reference to FIG. 9, deriving the second set of timing offsets may involve, at 810, adding to each offset a timing difference between the first and second reference cells. For example, adding the timing difference may involve, at 812, adding a given time difference that is based at least in part on the assistance data from the network. In another example, adding the timing difference may involve, at 814, adding a given time difference that is based at least in part on measurements made by the ME as part of a handover procedure. In yet another example, adding the timing difference may involve, at 816, adding a given time difference that is received from the network in association with a handover procedure.

Figure 10:
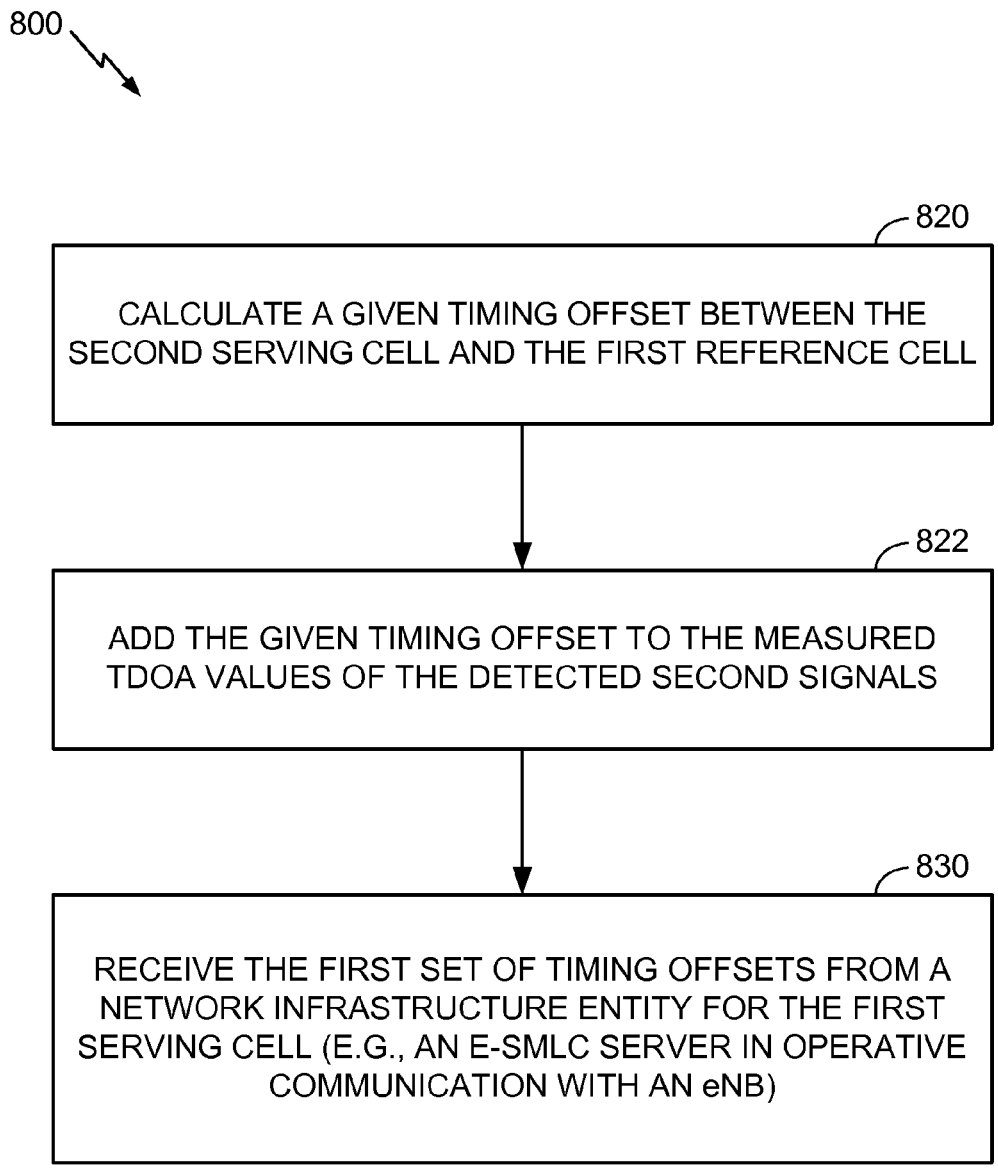

With reference to FIG. 10, in one embodiment, the first reference cell may comprise, or may be the same as, the second reference cell. Adjusting the measured TDOA values of the detected second signals may involve, at 820, calculating a given timing offset between the second serving cell and the first reference cell. Adjusting the measured TDOA values of the detected second signals may further involve, at 822, adding the given timing offset to the measured TDOA values of the detected second signals. In related aspects, receiving the first set of timing offsets may involve, at 830, receiving the first set of timing offsets in the assistance data from a network infrastructure entity, such as, for example, an E-SMLC or the like. The network infrastructure entity may be in operative communication with an eNB.

Figure 11:
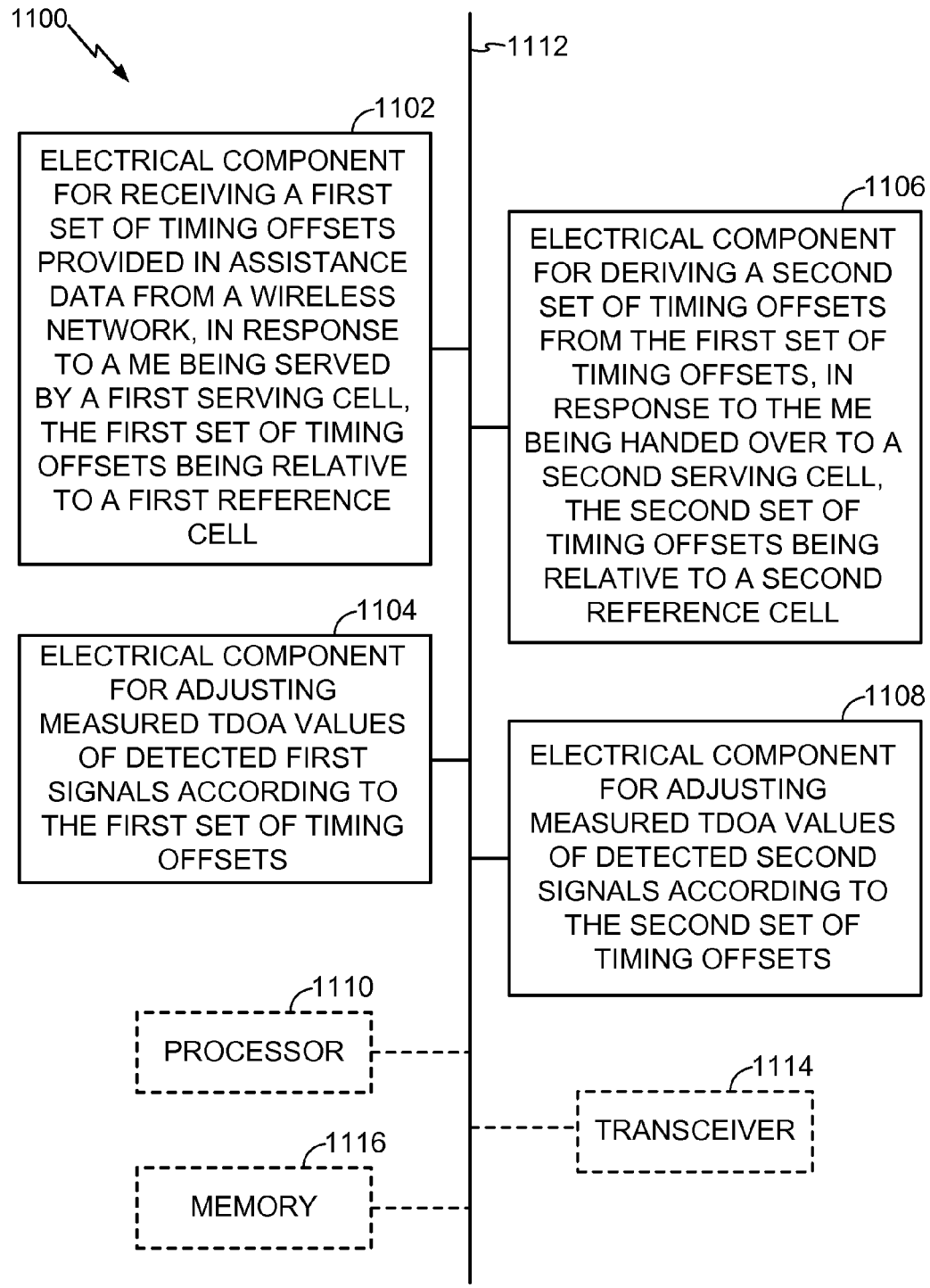
FIG. 11 illustrates an exemplary apparatus for OTDOA continuity at handover.

In accordance with one or more aspects of the embodiments described herein, there are provided devices and apparatuses for OTDOA continuity at handover, as described above with reference to FIGS. 8-10. With reference to FIG. 11, there is provided an exemplary apparatus 1100 that may be configured as a ME in a wireless network, or as a processor or similar device for use within the ME. The apparatus 1100 may include functional blocks that can represent functions implemented by a processor, software, or combination thereof (e.g., firmware). As illustrated, in one embodiment, the apparatus 1100 may comprise an electrical component or module 1102 for receiving a first set of timing offsets provided in assistance data from the network, in response to the ME being served by a first serving cell. The first set of timing offsets may be relative to a first reference cell. The apparatus 1100 may comprise an optional electrical component 1104 for adjusting measured TDOA values of detected first signals according to the first set of timing offsets. The apparatus 1100 may comprise an electrical component 1106 for deriving a second set of timing offsets from the first set of timing offsets, in response to the ME being handed over to a second serving cell. The second set of timing offsets may be relative to a second reference cell. The apparatus 1100 may comprise an optional electrical component 1108 for adjusting measured TDOA values of detected second signals according to the second set of timing offsets.

Figure 12:
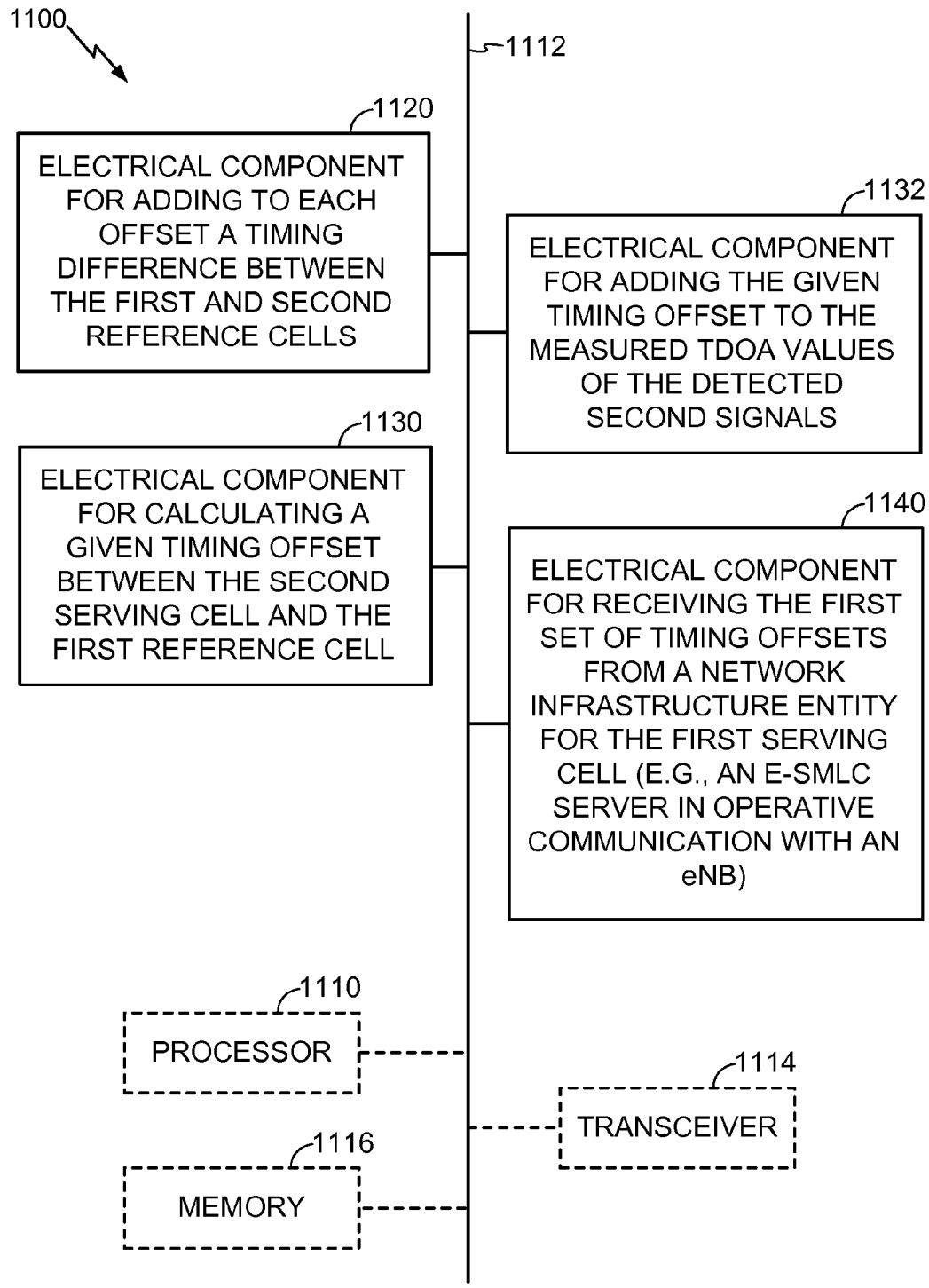
FIG. 12 shows further aspects of the apparatus of FIG. 11.

With reference to FIG. 12, the apparatus 1100 may comprise an electrical component 1120 for adding to each offset a timing difference between the first and second reference cells. To deal with a scenario where the first reference cell may comprise, or may be the same as, the second reference cell, the apparatus 1100 may comprise an electrical component 1130 for calculating a given timing offset between the second serving cell and the first reference cell. The apparatus 1100 may comprise an electrical component 1132 for adding the given timing offset to the measured TDOA values of the detected second signals. In related aspects, the apparatus 1100 may comprise an electrical component 1140 for receiving the first set of timing offsets in the assistance data from a network infrastructure entity, such as, for example, an E-SMLC that is in operative communication with an eNB or the like.

In related aspects, the apparatus 1100 may optionally include a processor component 1110 having at least one processor, in the case of the apparatus 1100 configured as a communication network entity, rather than as a processor. The processor 1110, in such case, may be in operative communication with the components 1102-1140 via a bus 1112 or similar communication coupling. The processor 1110 may effect initiation and scheduling of the processes or functions performed by electrical components 1102-1140.

In further related aspects, the apparatus 1100 may include a radio transceiver component 1114. A stand alone receiver and/or stand alone transmitter may be used in lieu of or in conjunction with the transceiver 1114. The apparatus 1100 may optionally include a component for storing information, such as, for example, a memory device/component 1116. The computer readable medium or the memory component 1116 may be operatively coupled to the other components of the apparatus 1100 via the bus 1112 or the like. The memory component 1116 may be adapted to store computer readable instructions and data for effecting the processes and behavior of the components 1102-1140, and subcomponents thereof, or the processor 1110, or the methods disclosed herein. The memory component 1116 may retain instructions for executing functions associated with the components 1102-1140. While shown as being external to the memory 1116, it is to be understood that the components 1102-1140 can exist within the memory 1116.

In accordance with one or more aspects of the embodiments described herein, there is provided a technique for measuring a TDOA value at a ME between signals from pairs of cells in a wireless system. The technique may involve measuring the TDOA value of signals arriving while the ME is in a first serving cell, and adjusting the measured TDOA values according to a first set of timing offsets provided in a set of assistance data, the first set of timing offsets being relative to a first reference cell. The technique may involve performing a handover to a second serving cell. The technique may involve measuring the TDOA value of signals arriving while the ME is in the second serving cell, and adjusting the measured TDOA values according to a second set of timing offsets derived from the first set of timing offsets, the second set of timing offsets being relative to a second reference cell.

In related aspects, the first reference cell and the second reference cell may be different. The second set of timing offsets is derived from the first set of timing offsets by adding to each offset the timing difference between the first and second reference cells. For example, the timing difference between the first and second reference cells may be derived from the set of assistance data. In another example, the timing difference between the first and second reference cells may be derived from measurements performed by the ME as part of the handover procedure. In yet another example, the timing difference between the first and second reference cells may be provided by the network to the ME in association with the handover procedure.

In further related aspects, the first reference cell and the second reference cell may be similar. For example, the reference cell may be different from the second serving cell. A given TDOA value measured while the ME is in the second serving cell may be adjusted by the offset of the measured cell relative to the reference cell.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes Compact Disc (CD), laser disc, optical disc, Digital Versatile Disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method operable by a mobile entity (ME) in a wireless network, comprising:
    during a period when the ME is being served by a first serving cell, receiving a plurality of timing offsets provided in positioning assistance data from the network, a first timing offset from the plurality timing offsets being relative to a reference cell;
    determining a first time difference of arrival (TDOA) of a signal from a first neighbor cell at the ME;
    in response to the ME being handed over to a second serving cell:
        calculating, at the ME, an adjusted timing offset based at least in part on a difference between a second timing offset and the first timing offset, the second timing offset being relative to the second serving cell;
        calculating a second TDOA based at least in part on a difference between an observed time of arrival of a signal from a second neighbor cell and the first timing offset, the second neighbor cell being different from the second serving cell;
        calculating an adjusted TDOA based at least in part on a difference between the second TDOA and the adjusted timing offset; and
        calculating a position of the ME based at least in part on the adjusted TDOA.

2. The method of claim 1, wherein the second timing offset is received in the positioning assistance data.

3. The method of claim 1, wherein the second timing offset is based at least in part on measurements made by the ME as part of a handover procedure.

4. The method of claim 1, wherein the second timing offset is received from the network in association with a handover procedure.

5. The method of claim 1, wherein the first serving cell comprises the reference cell.

6. The method of claim 1, wherein determining the first TDOA comprises calculating a difference between an observed time of arrival of the signal from the first neighbor cell and the first timing offset.

7. The method of claim 1, wherein the plurality of timing offsets is received from a network infrastructure entity for the first serving cell.

8. The method of claim 7, wherein the network infrastructure entity comprises an Evolved Serving Mobile Location Center (E-SMLC) server.

9. The method of claim 8, wherein the E-SMLC is in operative communication with an evolved Node B (eNB).

10. An apparatus, comprising:
a memory unit; and
at least one processor coupled to the memory unit, the at least one processor configured:
to receive a plurality of timing offsets provided in positioning assistance data from a wireless network during a period when a mobile entity (ME) is being served by a first serving cell, a first timing offset from the plurality timing offsets being relative to a reference cell;
to determine a first time difference of arrival (TDOA) of a signal from a first neighbor cell at the ME;
in response to the ME being handed over to a second serving cell:
to calculate, at the ME, an adjusted timing offset based at least in part on a difference between a second timing offset and the first timing offset, the second timing offset being relative to the second serving cell;
to calculate a second TDOA based at least in part on a difference between an observed time of arrival of a signal from a second neighbor cell and the first timing offset, the second neighbor cell being different from the second serving cell;
to calculate an adjusted TDOA based at least in part on a difference between the second TDOA and the adjusted timing offset; and
to calculate a position of the ME based at least in part on the adjusted TDOA.

11. The apparatus of claim 10, wherein the second timing offset is received in the positioning assistance data.

12. The apparatus of claim 10, wherein the second timing offset is based at least in part on measurements made by the ME as part of a handover procedure.

13. The apparatus of claim 10, wherein the second timing offset is received from the network in association with a handover procedure.

14. The apparatus of claim 10, wherein the first serving cell comprises the reference cell.

15. The apparatus of claim 10, wherein the at least one processor is further configured to determine the first TDOA by calculating a difference between an observed time of arrival of the signal from the first neighbor cell and the first timing offset.

16. The apparatus of claim 10, wherein the at least one processor is further configured to receive the plurality of timing offsets from a network infrastructure entity for the first serving cell.

17. The apparatus of claim 16, wherein the network infrastructure entity comprises an Evolved Serving Mobile Location Center (E-SMLC) server.

18. The apparatus of claim 17, wherein the E-SMLC is in operative communication with an evolved NodeB (eNB).

19. An apparatus, comprising:
means for receiving a plurality of timing offsets provided in positioning assistance data from a wireless network during a period when a mobile entity (ME) is being served by a first serving cell, a first timing offset from the plurality timing offsets being relative to a reference cell;
means for determining a first time difference of arrival (TDOA) of a signal from a first neighbor cell at the ME;
in response to the ME being handed over to a second serving cell:
means for calculating, at the ME, an adjusted timing offset based at least in part on a difference between a second timing offset and the first timing offset, the second timing offset being relative to the second serving cell;
means for calculating a second TDOA based at least in part on a difference between an observed time of arrival of a signal from a second neighbor cell and the first timing offset, the second neighbor cell being different from the second serving cell;
means for calculating an adjusted TDOA based at least in part on a difference between the second TDOA and the adjusted timing offset; and
means for calculating a position of the ME based at least in part on the adjusted TDOA.

20. The apparatus of claim 19, wherein the second timing offset is received in the positioning assistance data.

21. The apparatus of claim 19, wherein the second timing offset is based at least in part on measurements made by the ME as part of a handover procedure.

22. The apparatus of claim 19, wherein the second timing offset is received from the network in association with a handover procedure.

23. The apparatus of claim 19, wherein the first serving cell comprises the reference cell.

24. The apparatus of claim 19, wherein the means for determining the first TDOA comprises means for calculating a difference between an observed time of arrival of the signal from the first neighbor cell and the first timing offset.

25. The apparatus of claim 19, further comprising means for receiving the plurality of timing offsets from a network infrastructure entity for the first serving cell.

26. The apparatus of claim 25, wherein the network infrastructure entity comprises an Evolved Serving Mobile Location Center (E-SMLC) server.

27. The apparatus of claim 26, wherein the E-SMLC is in operative communication with an evolved NodeB (eNB).

28. A computer program product, the computer program product comprising:
a non-transitory computer-readable medium having program code recorded thereon, the program code comprising:
program code to receive a plurality of timing offsets provided in positioning assistance data from a wireless network during a period when a mobile entity (ME) is being served by a first serving cell, a first timing offset from the plurality timing offsets being relative to a reference cell;
program code to determine a first time difference of arrival (TDOA) of a signal from a first neighbor cell at the ME;
in response to the ME being handed over to a second serving cell:
program code to calculate, at the ME, an adjusted timing offset based at least in part on a difference between a second timing offset and the first timing offset, the second timing offset being relative to the second serving cell;
program code to calculate a second TDOA based at least in part on a difference between an observed time of arrival of a signal from a second neighbor cell and the first timing offset, the second neighbor cell being different from the second serving cell;

program code to calculate an adjusted TDOA based at least in part on a difference between the second TDOA and the adjusted timing offset; and program code to calculate a position of the ME based at least in part on the adjusted TDOA.

29. The computer program product of claim 28, wherein the second timing offset is received in the positioning assistance data.

30. The computer program product of claim 28, wherein the second timing offset is based at least in part on measurements made by the ME as part of a handover procedure.

31. The computer program product of claim 28, wherein the second timing offset is received from the network in association with a handover procedure.

32. The computer program product of claim 28, wherein the first serving cell comprises the reference cell.

33. The computer program product of claim 28, wherein the program code to determine the first TDOA comprises program code to calculate a difference between an observed time of arrival of the signal from the first neighbor cell and the first timing offset.

34. The computer program product of claim 28, wherein the plurality of timing offsets is received from a network infrastructure entity for the first serving cell.

35. The computer program product of claim 34, wherein the network infrastructure entity comprises an Evolved Serving Mobile Location Center (E-SMLC) server.

36. The computer program product of claim 35, wherein the E-SMLC is in operative communication with an evolved NodeB (eNB).

* * * * *